No. 608,220. Patented Aug. 2, 1898.
A. PLAGMAN.
MECHANICAL MOVEMENT.
(Application filed Mar. 24, 1898.)

(No Model.)

Witnesses
Wm. Bauman Jr.
W. A. Thornton.

Inventor
A. Plagman,
per L. G. Susemihl,
Attorney

UNITED STATES PATENT OFFICE.

ADOLPH PLAGMAN, OF DAVENPORT, IOWA.

MECHANICAL MOVEMENT.

SPECIFICATION forming part of Letters Patent No. 608,220, dated August 2, 1898.

Application filed March 24, 1898. Serial No. 675,006. (No model.)

*To all whom it may concern:*

Be it known that I, ADOLPH PLAGMAN, a citizen of the United States, residing at Davenport, in the county of Scott and State of Iowa, have invented certain new and useful Improvements in Mechanical Movements; and I do hereby declare the following to be a full, clear, and exact description of the invention, such as will enable others skilled in the art to which it appertains to make and use the same.

My invention relates to an improvement in mechanical movements and which is intended more especially for use in washing-machines, churns, and other machines of that class in which a reciprocating rotary motion is required; and it consists in a vertical shaft which has a rotary reciprocating motion, a cylinder which is splined upon the shaft and has a vertical movement thereon and provided with a number of pins, projections, or teeth, and a shaft which is rotated always in the same direction and is provided with a spur, gear, or pinion upon its inner end to mesh with the said pins, projections, or teeth upon the cylinder, combined with a suitable framework in which the two shafts, placed at right angles, are journaled, and suitable stop-guides by means of which the cylinder-pins are held in contact with the pinion, and which stop-guides serve to start the cylinder and the shaft upon which it is splined to rotating in the opposite direction, as will be more fully described hereinafter.

The object of my invention is to produce a mechanical movement for light machinery whereby while the shaft to which the handle is applied is rotated continuously in either direction the vertical shaft carrying the stirrer or the dasher may have a rotary reciprocating motion imparted to it without any jarring motion or any unnecessary amount of noise or wear upon the operating parts.

Figure 1:
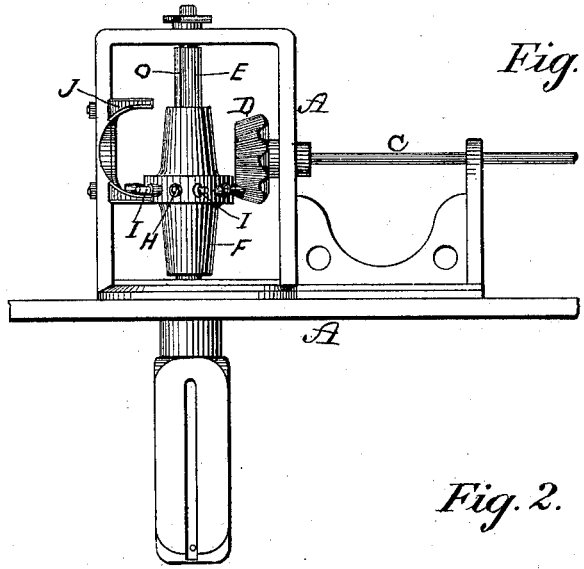
Figure 2:
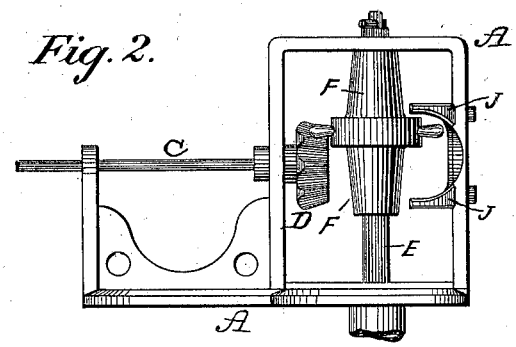
Figure 3:
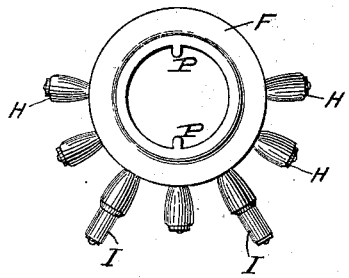
Figure 4:
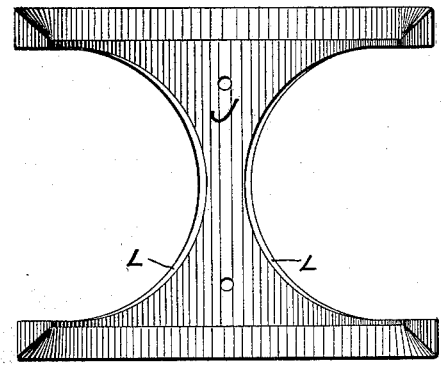

In the accompanying drawings, which represent my invention, Figure 1 is a side elevation of a mechanical movement which embodies my invention, showing the parts in one position. Fig. 2 is a reverse view showing the cylinder raised upon its shaft. Fig. 3 is a plan view of the cylinder alone. Fig. 4 is a detached view of the guide-stops.

A represents a suitable framework which is secured to the cover of the washing-machine or churn to which the motor is to be applied and in which the operating-shaft C, provided with a suitable handle at its outer end and the pinion or gear D at its inner end, is journaled, and which shaft is to be revolved continuously in either direction. The pinion or gear upon the inner end of the shaft has larger and more rounded spaces between its teeth than ordinary spur-gears; but with this exception this gear or pinion differs but little in shape from gears ordinarily used. In this instance but seven teeth are used; but I do not confine myself to this particular number. The inner end of the frame is made rectangular, as shown, and passing vertically through it is the shaft E, which has secured to its lower end a stirrer, dasher, or other device, according to the use to which the machine is to be applied. This shaft has its upper end to project above the rectangular portion of the frame and is supported in position by means of a pin or other device which is passed through a hole made in the upper reduced end of the shaft, as shown. This shaft is grooved, as shown at O in Fig. 1, upon one or more sides, so as to receive splines P, formed inside of the cylinder F, which is placed thereon and which has a vertical play upon the shaft while the operating-shaft is in motion. This cylinder is enlarged at its center, and projecting therefrom are seven pins, projections, or teeth H I and which correspond in number to the number of teeth upon the gear or pinion upon the driving-shaft. The two teeth or projections I are longer than the other five, and upon all of the pins or projections H I are placed friction-rollers which just fit the grooves in the wheel or gear and reduce the friction upon the moving parts as much as possible. The two projections, teeth, or pins I are made longer than the others, because they are brought into contact with the stop-guides when the motion of the cylinder and the shaft upon which it is placed is to be reversed.

Secured to the inner side of the rectangular portion of the frame or cast as a part thereof, as may be preferred, is the stop-guide J, which is provided with two concave curved surfaces L, as shown, and against which curved surfaces the outer ends of the two longer pins, projections, or teeth I come in contact. The lower ends of these curved surfaces are about on a level with the pins or projections H I, and hence as the cylinder is caused to revolve by the pins or projections catching between the teeth upon the driving-gear the two teeth I I are caused to ride up the two curved surfaces L and by coming in contact with these surfaces prevent the cylinder-pins from becoming separated from the pinion.

The pins, teeth, or projections H I are placed upon one side of the cylinder and are always in contact with the gear or pinion. When the gear or pinion is first started to revolve, its teeth catch between the pins or projections H I, and thus rotate the cylinder or shaft upon which they are placed until one of the long teeth or projections I comes in contact with one of the curved surfaces L, and the movement of the gear or pinion is simply to raise the cylinder upon the shaft, and during the time that the tooth or projection I is traveling upon the curved surface from its lower end to about its center the movement of the cylinder and the shaft in one direction continues; but about the time that the pin or projection I reaches the center of the curved surface L the movement of the cylinder or shaft is gradually stopped, and then as the pin or projection continues on up the movement of the cylinder is reversed and the vertical shaft is made to turn in the opposite direction, and this motion in the opposite direction continues until the other tooth or projection has passed down from the top of the other curved surface to about its center, where the movement again ceases in one direction and begins in the other. This rotary movement then continues until the long tooth or projection I, moving in advance, has reached the center of the other curved surface L, when the motion is again reversed.

While the driving-shaft is in motion the cylinder alternately rises and falls upon its vertical shaft and is caused to rotate first in one direction and then the other by the meshing of the teeth of the gear or pinion with the pins or projections upon the cylinder, and the reversal of the movement takes place so gradually that there is no unnecessary shock, noise, or wear of the parts, the two long teeth being in contact with the curved surfaces during the whole of the time that the cylinder is rising and falling, and the pins or projections upon the cylinder being supported or carried by the teeth of the gear or pinion there is no dropping of the cylinder in such a manner as to produce shocks or vibrations, as would be the case if the cylinder was allowed to drop from its own gravity. At no time are the teeth of the pinion or gear out of contact with the pins or projections upon the cylinder, and the teeth of the gear or pinion not only raise the cylinder, but support it in connection with the curved surfaces during both its upward and downward movements.

Having thus described my invention, I claim—

1. A shaft which revolves continuously in one direction, and is provided upon its inner end with a gear or pinion, combined with a vertically-moving cylinder provided with pins or projections between its ends, and which pins or projections mesh with the teeth of the pinion or gear, a vertical shaft upon which the cylinder is splined, and stop-guides with which two of the teeth upon the cylinder engage, substantially as shown.

2. A suitable frame, a horizontal driving-shaft journaled therein, provided with a pinion or gear at its inner end, a vertical shaft provided with a suitable device at its lower end, and a cylinder having a rising-and-falling movement upon its upper portion, and which cylinder is provided with teeth of unequal lengths, combined with suitable stop-guides with which the long teeth upon the cylinder engage, and which cylinder has a vertical rotary reciprocating motion with the vertical shaft, substantially as described.

3. A mechanical movement composed of a suitable framework, two shafts placed at right angles to each other, the driving-shaft being provided with a gear or pinion upon its inner end, and a vertically-moving cylinder splined upon the vertical shaft, and which cylinder is provided with teeth or projections of unequal length, combined with a stop-guide, having two curved surfaces which extend in opposite directions, and with which curved surfaces the pins upon the cylinder engage, the cylinder being raised and lowered and made to reverse its rotary movement by the teeth of the pinion catching under the pins or projections upon the cylinder, while first raising the cylinder and then lowering it, substantially as set forth.

In testimony whereof I affix my signature in presence of two witnesses.

ADOLPH PLAGMAN.

Witnesses:
  I. C. ANDERSON,
  M. A. BLAIR.